United States Patent [19]

Brieseck et al.

[11] Patent Number: 4,651,584
[45] Date of Patent: Mar. 24, 1987

[54] COUPLING ARRANGEMENT BETWEEN A LINEAR CONTROL ELEMENT AND A PIVOTABLE ELEMENT, ESPECIALLY A CONTROL SURFACE

[75] Inventors: Bernd Brieseck, Henfenfeld; Josef Nagler, Rothenbach, both of Fed. Rep. of Germany

[73] Assignee: Diehl GmbH & Co., Nuremberg, Fed. Rep. of Germany

[21] Appl. No.: 792,458

[22] Filed: Oct. 29, 1985

[30] Foreign Application Priority Data

Nov. 14, 1984 [DE] Fed. Rep. of Germany ....... 3441533

[51] Int. Cl.$^4$ .............................................. F16H 21/44
[52] U.S. Cl. .......................................... 74/102; 74/104
[58] Field of Search ............... 74/104, 102, 625, 89.15

[56] References Cited

U.S. PATENT DOCUMENTS

| 3,104,592 | 9/1963 | Sheesley | 74/104 X |
|---|---|---|---|
| 3,143,131 | 8/1964 | Spencer | 74/104 X |
| 3,225,612 | 12/1965 | Topinka | 74/102 |
| 3,507,192 | 4/1970 | Stokke | 74/104 X |
| 3,635,304 | 1/1972 | Hills | 74/102 X |
| 3,709,106 | 1/1973 | Shafer | 74/104 X |
| 3,766,835 | 10/1973 | Kobelt | 74/104 X |
| 4,585,216 | 4/1986 | Boyer et al. | 74/89.15 X |

FOREIGN PATENT DOCUMENTS 345253  4/1960  Switzerland ........................ 74/104

Primary Examiner—Dennis L. Taylor
Attorney, Agent, or Firm—Scully, Scott, Murphy & Presser

[57] ABSTRACT

A coupling arrangement between a linear control element and a pivoting element, especially for an aerodynamic control surface of a guidable missile. The coupling arrangement has the pivoting element equipped with a pivot arm which extends radially from its axis of rotation, wherein the pivot arm is oriented transverse to the sliding or thrust axis of the control element which, in turn, is oriented transverse to the axis of rotaion, and in which the pivot arm stands in engagement with the control element.

6 Claims, 1 Drawing Figure

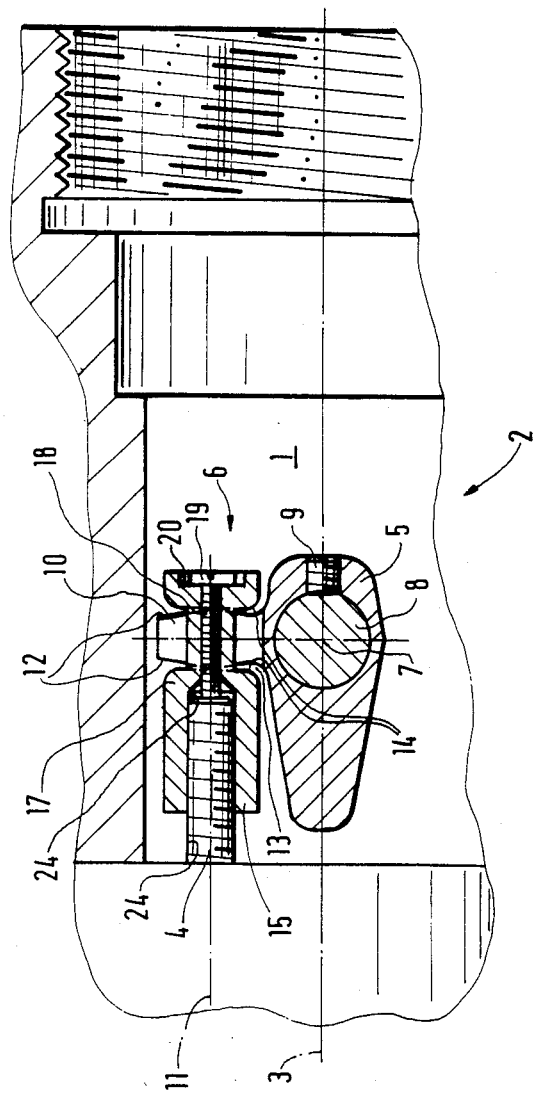

COUPLING ARRANGEMENT BETWEEN A LINEAR CONTROL ELEMENT AND A PIVOTABLE ELEMENT, ESPECIALLY A CONTROL SURFACE

BACKGROUND OF THE INVENTION

1. Field of the Invention

The present invention relates to a coupling arrangement between a linear control element and a pivoting element, especially for an aerodynamic control surface of a guidable missile.

2. Discussion of the Prior Art

An arrangement of that type has become known from the disclosure of German Pat. No. 24 10 255 in the structural shape of a ring which, as a result of the axial-parallel engagement of a linear control element, is pivotable about a diagonal in which there lie the pivot axes of mutually oppositely located and oppositely directed control surfaces for the oversized-caliber four-bladed control surface system of a rocket. However, especially disadvantageous in an arrangement of that type is the fact that the setting or control element is connected to the coupling arrangement outside externally of the interior space of the equipment, which exerts a negative influence over the aerodynamic properties; and because of the ring-shaped arrangement about the outer periphery of the equipment, it is possible to carry out only considerably restricted pivoting movements of the control surfaces. When a mechanism of type were to be utilized in projectiles which are fired from a firing tube or weapon barrel, subjecting it to the gas pressure of propellant charges can lead to functioning problems due to the high mechanical loading and fouling thereof with propellant residues.

SUMMARY OF THE INVENTION

Accordingly, in recognition of these conditions, it is an object of the present invention to so construct a coupling arrangement of the foregoing type, as to produce a compact and protected construction which is capable of withstanding the highest mechanical loading, which operates in an extremely precise mode, and also affords capabilities for its simple assembly and adjustment.

The foregoing object is inventively achieved in that the coupling arrangement of the type described has the pivoting element equipped with a pivot arm which extends radially from its axis of rotation, wherein the pivot arm is oriented transverse to the sliding or thrust axis of the control element which, in turn, is oriented transverse to the axis of rotation, and in which the pivot arm stands in engagement with the control element.

Pursuant to the foregoing object, the pivot axis of the pivoting element and the sliding axis of the linear control element which is oriented transversely thereof, can be located in close proximity with each other, and as a result there can be implemented a compact arrangement, whereby it is only necessary to provide a short and consequently mechanically highly-loadable pivot lever for the form-fitted connection. The geometry which is present between the contact surfaces of the pivot arm and the control element determines the limits of the possible stroke of displacement of the control element with respect to the pivot axis of the pivoting element which is fixed relative to the equipment, and thereby its pivoting angle. As a whole, there is thus obtained a construction which is compact and mechanically less complex, inasmuch as there are avoided connections secured from rotation, which are complex in the drive technology, (gear connections, ball joints or cardan linkages). Since the pivot arm needs to merely engage into a recess provided in the nearby arranged control element (or reversely), there are obtained simple assembling possibilities through the radial engagement of the pivot arm into the control element, and space-saving arranging possibilities in the tubular tail end structure; for example, of a projectile or missile which is guidable in its final flight phases.

BRIEF DESCRIPTION OF THE DRAWING

Additional alternatives and modifications as well as further features and advantages of the invention can now be readily ascertained from the following detailed description, taken in conjunction with the accompanying single FIGURE of the drawing, illustrating in a fragmentary longitudinal sectional view the tail end region of a missile, through a linear control element and the pivot bearing for the control surface extending transversely thereof; relative to its support on the tail end structure, concerning which reference is made to the disclosure of applicants' concurrently filed, copending patent application entitled "Pivot Bearing Arrangement for the Control Surface of a Missile".

DETAILED DESCRIPTION

Within the cylindrical hollow interior 1 of the tail end portion 2 of a missile; for example, a mortar grenade which is guided during its final phase of flight, a linear control element 4 extends in parallel with the longitudinal axis 3 of the missile, with which element there is form-fittedly connected a pivoting element 5 oriented transversely thereof through the intermediary of a coupling arrangement 6. The control element 4 may comprise; for instance, the piston or the piston rod of the cylinder of a pneumatic control system, or to a spindle which is rotatable by means of the rotor of a control motor and, as a consequence, is thereby axially displaceable.

The pivoting element 5 represents the interconnection between coacting control surface shafts 8 on diametrically oppositely located vanes or control surfaces, which are arranged externally of the tail end section 2 to extend in the direction of the longitudinal axis 3 and which are movable about an axis of rotation 7; in effect, which can be positioned opposite the longitudinal axis 3; for which purpose the pivoting element 5 is secured fixed against relative rotation with the control surface shafts 8; for example, through the intermediary of a headless screw or threaded pin 9.

For the relaying of the linear movement of the control element 4 into a rotational movement of the pivoting element 5, the last-mentioned element is equipped with a pivot arm 10 which projects radially from the axis of rotation 7, wherein in the illustrated embodiment, the arm 10 is integrally formed with the pivoting element 5. The pivot arm 10 is oriented to extend transversely of the axis of rotation 7, and is oriented transversely of (as a rule in parallel with the longitudinal axis 3 of the tail end section) displacement or sliding axis 11 of the control element 4. Through oppositely inclined support surfaces 12, which (in the illustrated embodiment alone on the pivot arm 10) are formed in the direction of the sliding axis 11, the pivot arm 10 is in closely-fitted engagement with the linear control element 4 through the coupling arrangement 6. In order to avoid any canting, the support surfaces 12 are pairedly constructed (oriented in the direction of the extension of the arm 10) as planar surfaces, which subtend among each other an extremely flat (obtuse) angle; for example, of about 163°; however, which within the range of their enclosed angle; in effect, in the region of the sliding axis 11, form a transition into each other as a convexly curved support region. For the form-fitted engagement on the support surfaces 12 of the coupling arrangement 6, pursuant to the illustrated embodiment, the pivot arm 10 is shaped as a two-pronged or forked element, of which a narrowed area of a control element-head portion 17 which is formed as a recess 13, is conducted in both linear directions of movement along the sliding axis 11; in essence, tangentially. The guide or supporting surfaces 14 which are formed on the head portion 17 as the boundary of the recess 13, are machined flat in the illustrated instance (oriented transverse to the sliding axis 11), inasmuch as the cambered or spherical transitions between the planar support surfaces 12 are formed on the opposite facing surfaces of the fork-shaped pivot arm 10.

For the adjustment of the pivoted position of the pivoting element 5 (relative to the longitudinal axis 3 of the equipment at a certain axial position of the linear control element 4), provision is made to construct the coupling arrangement 6 with the recess 13 separately of the control element 4, and to fasten both together by means of an adjusting screw 24 so as to be axially adjustable with respect to each other.

For this purpose, the coupling arrangement 6 is constructed as a hollow cylinder 15 to such an extent that at its open end it is thread by means of an internal screw thread 24 onto the screw thread 24 of the cylindrical control element 4, and in the extension of its head region 17 is provided with the recess 13 which extends in a groove-shape about the outer circumference. At a predetermined position of the control element 4 relative to the tail end section 2 of the equipment, thereby the axial depth of engagement of the internal screw thread 24 of the hollow cylinder determines by means of that end of the control element 4, the momentary angular position of the pivot arm 10 and, thereby, the positioning of the control surface about its axis of rotation 7. In order to secure this axial position between the hollow cylinder 15 and the control element 4, there is provided a counterscrew 18 which is axially-parallel accessible through the rear of the tail end section 2, and extends coaxially through the head portion 17 of the coupling arrangement 6 into the neighboring end surface of the control element 4; which is drawn with its screwhead 19 against the end surface 20 of the head portion 17 (for example, against a coaxial recess machined therein), when the coupling arrangement 6 has assumed the desired axial position with regard to the control element 4.

Instead of such a configuration of the coupling arrangement 6 as a sleeve-like hollow cylinder 15 with a recess 13 in its head portion 17, the end surface of the control element 14 can also directly serve as one of the supporting surfaces 14, and the head 19 of the here screwed-in counterscrew 18 as the oppositely lying supporting surface 14.

What is claimed is:

1. In a coupling arrangement between a linear control element and a pivoting element, especially for an aerodynamic control surface of a guidable missile; the improvement comprising: said pivot element including a pivot arm radially projecting from the axis of rotation of said pivoting element, said pivot arm being oriented transverse to the sliding axis of the linear control element, said control element being oriented transverse to the axis of rotation of said pivoting element, said pivot arm being in engagement with said linear control element, said pivot arm engaging tangentially on both sides of a recess formed in said control element, said recess being formed in the head portion of a hollow cylinder engaging sleeve-like over the end of the control element and including an internal adjusting screw thread which is screwed onto an external screw thread on the the control element.

2. In a coupling arrangement between a linear control element and a pivoting element, especially for an aerodynamic control surface of a guidable missile; the improvement comprising: said pivot element including a forked pivot arm radially projecting from the axis of rotation of said pivoting element, said pivot arm being oriented transverse to the sliding axis of the linear control element, said control element being oriented transverse to the axis of rotation of said pivoting element, said pivot arm being in engagement with said linear control element, said forked pivot arm engaging tangentially on both sides of a recess formed in said control element, said recess being formed in the head portion of a hollow cylinder which engages sleeve-like over the end of the control element.

3. A coupling arrangement as claimed in claim 1 or 2, comprising surfaces contacting each other in the region of engagement of said control element with the pivot arm in every direction of movement of the control element, at least one said surface being spherically convexly shaped in the region of said axis of the control element.

4. A coupling arrangement as claimed in claim 1, wherein the pivot arm has a forked shape.

5. A coupling arrangement as claimed in claim 1 or 2, in which the recess is formed between an end surface of the control element and a screwhead of a screw arranged axially ahead thereof.

6. A coupling arrangement as claimed in claim 1 or 2, wherein a counterscrew passes through the hollow cylinder with the recess in the head portion thereof extending in parallel with the longitudinal axis of the arrangement, said counterscrew being screwed into the end surface of said linear control element.

* * * * *